(12) United States Patent
Lan et al.

(10) Patent No.: US 11,776,493 B2
(45) Date of Patent: Oct. 3, 2023

(54) BACKLIGHT MODULE AND DISPLAY DEVICE INCLUDING THE SAME

(71) Applicant: TCL China Star Optoelectronics Technology Co., Ltd., Shenzhen (CN)

(72) Inventors: Qingsheng Lan, Shenzhen (CN); Fuyi Wang, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/960,557

(22) PCT Filed: May 14, 2020

(86) PCT No.: PCT/CN2020/090357
§ 371 (c)(1),
(2) Date: Jul. 8, 2020

(87) PCT Pub. No.: WO2021/217732
PCT Pub. Date: Nov. 4, 2021

(65) Prior Publication Data
US 2023/0100512 A1 Mar. 30, 2023

(30) Foreign Application Priority Data
Apr. 28, 2020 (CN) .......................... 202010350751.1

(51) Int. Cl.
*G09G 3/34* (2006.01)
*G09G 3/36* (2006.01)

(52) U.S. Cl.
CPC ............. *G09G 3/3426* (2013.01); *G09G 3/36* (2013.01); *G09G 2300/0819* (2013.01); *G09G 2310/08* (2013.01); *G09G 2320/0233* (2013.01)

(58) Field of Classification Search
CPC ................... G09G 3/3426; G09G 3/36; G09G 2300/0819; G09G 2310/08; G09G 2320/0233; G09G 3/34
See application file for complete search history.

(56) References Cited

U.S. PATENT DOCUMENTS

| 11,361,712 B2* | 6/2022 | Xu ........................ G09G 3/3275 |
| 2011/0063268 A1 | 3/2011 | Knapp | |
| 2017/0193927 A1* | 7/2017 | Yang ..................... G09G 3/3426 |

(Continued)

FOREIGN PATENT DOCUMENTS

| CN | 101159121 A | 4/2008 |
| CN | 104282265 A | 1/2015 |
| CN | 104715717 A | 6/2015 |

(Continued)

*Primary Examiner* — Roy P Rabindranath
(74) *Attorney, Agent, or Firm* — Nathan & Associates; Menachem Nathan

(57) ABSTRACT

A backlight module and a display device are provided. The backlight module includes a backlight and a driving circuit for driving the backlight. In the driving circuit corresponding to at least one backlight unit in the backlight, a data signal input module is configured for inputting a first data signal to a first point during a detection stage, and inputting a compensated second data signal to the first point according to a threshold voltage detected by a detection module during a display stage. The present invention improves uniformity of light emission of the backlight module.

20 Claims, 3 Drawing Sheets

(56) References Cited

U.S. PATENT DOCUMENTS

2019/0325822 A1   10/2019  Li
2021/0390916 A1*  12/2021  Shi ........................ G09G 3/342

FOREIGN PATENT DOCUMENTS

| CN | 106652911 | A | 5/2017 |
| CN | 107424567 | A | 12/2017 |
| CN | 108806599 | A | 11/2018 |
| CN | 109036268 | A | 12/2018 |
| KR | 20130110578 | A | 10/2013 |

* cited by examiner

BACKLIGHT MODULE AND DISPLAY DEVICE INCLUDING THE SAME

FIELD OF INVENTION

The present invention relates to the field of display technologies, and in particular, to a backlight module and a display device.

BACKGROUND OF INVENTION

In a current active matrix light emitting diode (AM-LED) backlight module, an LED device usually uses a thin film transistor driving circuit to drive and emit light. However, due to manufacturing process or aging, a threshold voltage of a driving transistor in the driving circuit is prone to drift, which makes threshold voltages of driving transistors in driving circuits of different LED devices different. Even if a voltage applied to the driving transistor is same, an actual driving current flowing through the LED device will eventually be different, resulting in differences in brightness of the LED device and uneven brightness of the entire backlight module.

Therefore, the current LED backlight module has a technical problem of uneven brightness and needs to be improved.

TECHNICAL PROBLEM

Embodiments of the present invention provide a backlight module and a display device to alleviate a technical problem of uneven brightness in current LED backlight module.

TECHNICAL SOLUTION

In order to solve the above problem, a technical solution provided by the present invention is as follows:

An embodiment of the present invention provides a backlight module comprising a backlight and a driving circuit for driving the backlight, wherein the backlight comprises a plurality of backlight units arranged in an array, each backlight unit is arranged corresponding to a partition of a liquid crystal display panel, and the driving circuit corresponding to at least one of the backlight units comprises:

a data signal input module configured to input a first data signal to a first point under a control of a first control signal during a detection stage;

a driving module connected to the data signal input module through the first point and connected to the backlight unit through a second point, and configured to drive the backlight unit to emit light under controls of a potential of the first point and a power high-potential signal;

a detection module connected to the driving module through the second point, and configured for detecting a threshold voltage of the driving module during the detection stage under a control of a second control signal;

a storage module connected to the driving module through the first point and configured to store the threshold voltage of the driving module;

wherein the data signal input module is further configured to input a compensated second data signal to the first point according to the threshold voltage detected by the detection module during a display stage.

In the backlight module of the present invention, the data signal input module comprises a first transistor, a gate of the first transistor is connected to the first control signal, a first electrode of the first transistor is connected to a data line, and a second electrode of the first transistor is connected to the first point.

In the backlight module of the present invention, the driving module comprises a second transistor, a gate of the second transistor is connected to the first point, a first electrode of the second transistor is connected to the power high-potential signal, and a second electrode of the second transistor is connected to the second point.

In the backlight module of the present invention, a first end of the backlight unit is connected to the second point, and a second end of the backlight unit is connected to a power low-potential signal.

In the backlight module of the present invention, the storage module comprises a storage capacitor, a first plate of the storage capacitor is connected to the first point, and a second plate of the storage capacitor is connected to the power low-potential signal.

In the backlight module of the present invention, the detection module comprises a third transistor and a selection switch, a gate of the third transistor is connected to the second control signal, a first electrode of the third transistor is connected to the second point, and a second electrode of the third transistor is connected to a moving contact of the selection switch; a first static contact of the selection switch is connected to an input end of a reference voltage, and a second static contact of the selection switch is connected to a detection end of the threshold voltage.

In the backlight module of the present invention, the detection module is configured to control the moving contact of the selection switch to connect to the first static contact during an initialization period of the detection stage, and control the moving contact of the selection switch to connect to the second static contact during a voltage detection period of the detection stage.

In the backlight module of the present invention, the detection module is further configured to report a detection result to a timing control chip after detecting the threshold voltage of the driving module.

In the backlight module of the present invention, the data signal input module is further configured to input an initial voltage signal to the first point under the control of the first control signal before the detection stage.

In the backlight module of the present invention, the driving circuit further comprises a compensation module, the compensation module is connected to the driving module through the first point, and is configured to pull down the potential of the first point to a potential lower than the power high-potential signal during a blank frame stage to cause a negative drift in the threshold voltage of the driving module.

The present invention further provides a display device comprising a liquid crystal display panel and a backlight module, wherein the backlight module comprises a backlight and a driving circuit for driving the backlight, wherein the backlight comprises a plurality of backlight units arranged in an array, each backlight unit is arranged corresponding to a partition of a liquid crystal display panel, and the driving circuit corresponding to at least one of the backlight units comprises:

a data signal input module configured to input a first data signal to a first point under a control of a first control signal during a detection stage;

a driving module connected to the data signal input module through the first point and connected to the backlight unit through a second point, and configured to drive the backlight unit to emit light under controls of a potential of the first point and a power high-potential signal;

a detection module connected to the driving module through the second point, and configured for detecting a threshold voltage of the driving module during the detection stage under a control of a second control signal;

a storage module connected to the driving module through the first point and configured to store the threshold voltage of the driving module;

wherein the data signal input module is further configured to input a compensated second data signal to the first point according to the threshold voltage detected by the detection module during a display stage.

In the display device of the present invention, the data signal input module comprises a first transistor, a gate of the first transistor is connected to the first control signal, a first electrode of the first transistor is connected to a data line, and a second electrode of the first transistor is connected to the first point.

In the display device of the present invention, the driving module comprises a second transistor, a gate of the second transistor is connected to the first point, a first electrode of the second transistor is connected to the power high-potential signal, and a second electrode of the second transistor is connected to the second point.

In the display device of the present invention, a first end of the backlight unit is connected to the second point, and a second end of the backlight unit is connected to a power low-potential signal.

In the display device of the present invention, the storage module comprises a storage capacitor, a first plate of the storage capacitor is connected to the first point, and a second plate of the storage capacitor is connected to the power low-potential signal.

In the display device of the present invention, the detection module comprises a third transistor and a selection switch, a gate of the third transistor is connected to the second control signal, a first electrode of the third transistor is connected to the second point, and a second electrode of the third transistor is connected to a moving contact of the selection switch; a first static contact of the selection switch is connected to an input end of a reference voltage, and a second static contact of the selection switch is connected to a detection end of the threshold voltage.

In the display device of the present invention, the detection module is configured to control the moving contact of the selection switch to connect to the first static contact during an initialization period of the detection stage, and control the moving contact of the selection switch to connect to the second static contact during a voltage detection period of the detection stage.

In the display device of the present invention, the detection module is further configured to report a detection result to a timing control chip after detecting the threshold voltage of the driving module.

In the display device of the present invention, the data signal input module is further configured to input an initial voltage signal to the first point under the control of the first control signal before the detection stage.

In the display device of the present invention, the driving circuit further comprises a compensation module, the compensation module is connected to the driving module through the first point, and is configured to pull down the potential of the first point to a potential lower than the power high-potential signal during a blank frame stage to cause a negative drift in the threshold voltage of the driving module.

Beneficial Effect

Beneficial effects of the present invention are: An embodiment of the present invention provides a backlight module and a display device. The backlight module comprises a backlight and a driving circuit for driving the backlight, wherein the backlight comprises a plurality of backlight units arranged in an array, each backlight unit is arranged corresponding to a partition of a liquid crystal display panel, and the driving circuit corresponding to at least one of the backlight units comprises a data signal input module, a driving module, a detection module, and a storage module. The data signal input module is configured to input a first data signal to a first point under a control of a first control signal during a detection stage. The driving module is connected to the data signal input module through the first point and connected to the backlight unit through a second point, and is configured to drive the backlight unit to emit light under controls of a potential of the first point and a power high-potential signal. The detection module is connected to the driving module through the second point, and is configured for detecting a threshold voltage of the driving module during the detection stage under a control of a second control signal. The storage module is connected to the driving module through the first point and is configured to store the threshold voltage of the driving module. Wherein the data signal input module is further configured to input a compensated second data signal to the first point according to the threshold voltage detected by the detection module during a display stage. The present invention detects the threshold voltage of the driving module by providing the detection module in the driving circuit corresponding to at least one of the backlight units, then in the display stage, the compensated second data signal is input to the first point according to the threshold voltage, which can compensate the threshold voltage drift of the driving module in the driving circuit corresponding to the backlight unit and reduce differences in driving current flowing through different backlight units, thereby improving uniformity of the light emitted by the backlight unit and the backlight module, and improving optical taste of products.

DESCRIPTION OF DRAWINGS

In order to more clearly illustrate the embodiments or the technical solutions in the prior art, a brief introduction of the drawings used in the embodiments or the prior art description will be briefly described below. Obviously, the drawings in the following description are only some of the embodiments of the invention, and those skilled in the art can obtain other drawings according to the drawings without any creative work.

DETAILED DESCRIPTION OF PREFERRED EMBODIMENTS

The following description of the various embodiments is provided with reference to the accompanying drawings. Directional terms, such as upper, lower, front, back, left, right, inner, outer, and lateral side, mentioned in the present invention are only for reference. Therefore, the directional terms are used for describing and understanding rather than limiting the present invention. In the figures, units having similar structures are used for the same reference numbers.

Figure 1:
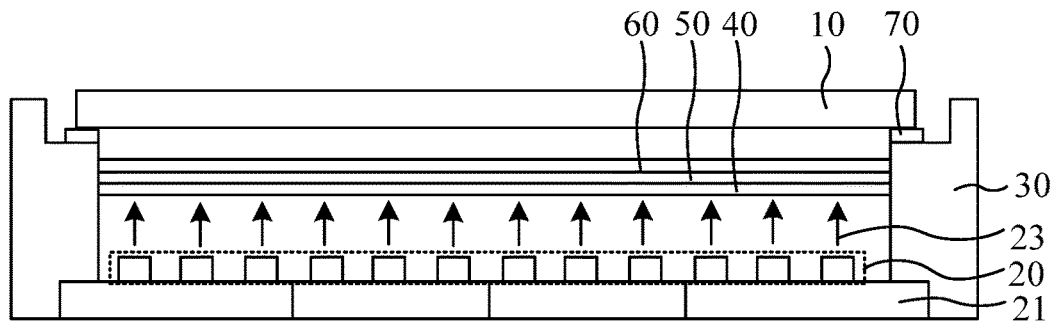
FIG. 1 is a schematic structural view of a display device provided by an embodiment of the present invention.

An embodiment of the present invention provides a display device. The display device may be a mobile phone, a computer, a tablet, an electronic watch, etc. As shown in FIG. 1, the display device comprises a backlight module and a liquid crystal display panel 10. The liquid crystal display panel 10 is fixed on a plastic frame 30 of the backlight module through an adhesive layer 70. Light 23 emitted by a backlight 20 disposed on a back plate 21 in the backlight module passes through a diffusion plate 40, a reflection sheet 50, and an optical film 60, and then is irradiated on the liquid crystal display panel 10. The light 23 first passes through a lower polarizer of the liquid crystal display panel 10 to become polarized light. The liquid crystal panel 10 inputs data signals with different sizes to each pixel through a switching function of a thin film transistor (TFT). Liquid crystal molecules rotate in different states at different voltages, so a degree of transmission of the polarized light varies, and brightness of the light emitted through an upper polarizer varies, so as to achieve a multi-grayscale screen display.

Figure 2:
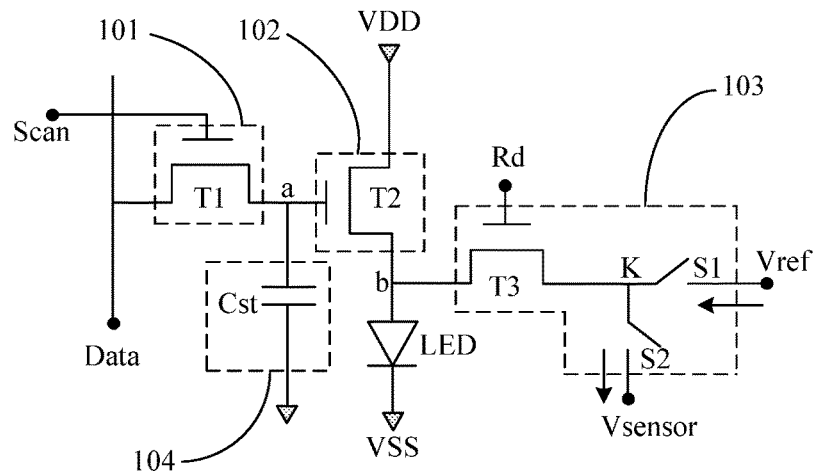
FIG. 2 is a first schematic structural view of a driving circuit corresponding to at least one of backlight units in a backlight module provided by an embodiment of the present invention.

The backlight module comprises a backlight and a driving circuit for driving the backlight. The backlight comprises a plurality of backlight units arranged in an array. Each backlight unit is arranged corresponding to a partition of a liquid crystal display panel. The driving circuit corresponding to at least one of the backlight units is shown in FIG. 2, which comprises a data signal input module 101, a driving module 102, a detection module 103, and a storage module 104.

The data signal input module 101 is configured to input a first data signal data1 to a first point a under a control of a first control signal Scan during a detection stage.

The driving module 102 is connected to the data signal input module 101 through the first point a and connected to the backlight unit 106 through a second point b, and is configured to drive the backlight unit 106 to emit light under controls of a potential of the first point a and a power high-potential signal VDD.

The detection module 103 is connected to the driving module 102 through the second point b, and is configured for detecting a threshold voltage Vth of the driving module 102 during the detection stage under a control of a second control signal Rd.

The storage module 104 is connected to the driving module 102 through the first point a and is configured to store the threshold voltage Vth of the driving module 102.

Wherein the data signal input module 101 is further configured to input a compensated second data signal data2 to the first point a according to the threshold voltage Vth detected by the detection module 103 during a display stage.

Specifically, the data signal input module 101 comprises a first transistor T1. A gate of the first transistor T1 is connected to the first control signal Scan, a first electrode of the first transistor T1 is connected to the data line Data, and a second electrode of the first transistor T1 is connected to the first point a.

A first end of the backlight unit 106 is connected to the second point b, and a second end of the backlight unit 106 is connected to a power low-potential signal VSS.

The driving module 102 comprises a second transistor T2. A gate of the second transistor T2 is connected to the first point a, a first electrode of the second transistor T2 is connected to the power high-potential signal VDD, and a second electrode of the second transistor T2 is connected to the second point b.

The detection module 103 comprises a third transistor T3 and a selection switch. A gate of the third transistor T3 is connected to the second control signal Rd, a first electrode of the third transistor T3 is connected to the second point b, and a second electrode of the third transistor T3 is connected to a moving contact K of the selection switch. A first static contact S1 of the selection switch is connected to an input end of a reference voltage Vref, and a second static contact S2 of the selection switch is connected to a detection end of the threshold voltage Vsensor.

The storage module 104 comprises a storage capacitor Cst. A first plate of the storage capacitor Cst is connected to the first point a, and a second plate of the storage capacitor Cst is connected to the power low-potential signal VSS.

In the present invention, each transistor is an N-type or P-type transistor. Among the first electrode and the second electrode of each transistor, one of them is a source and the other is a drain. A voltage value output by the power high-potential signal VDD is greater than a voltage value output by the power low-potential signal VSS. The first control signal Scan is a scan signal provided by a scan line. In the driving module 102, the second transistor T2 is a driving transistor, and the threshold voltage of the driving module 102 is the threshold voltage Vth of the second transistor T2.

Figure 3:
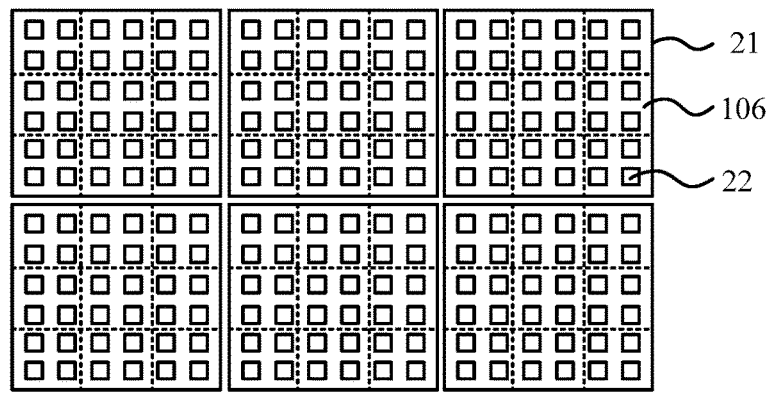
FIG. 3 is a schematic structural view of the backlight module provided by an embodiment of the present invention.

As shown in FIG. 3, the backlight module comprises a plurality of spliced backplanes 21. Each backplane 21 is provided with a plurality of LED devices 22, and all the LED devices 22 in the backlight module form a backlight source. In each backplane 21, the backlight source further comprises a plurality of backlight units 106. The plurality of backlight units 106 are arranged in an array, and each backlight unit 106 comprises the plurality of LED devices 22 connected in series. After binding the liquid crystal display panel to make the display device, each backlight unit 106 in the backlight module is arranged corresponding to a partition of a liquid crystal display panel. Each LED device 22 in each backlight unit 106 is driven by a driving circuit to emit light. The backlight module of the present invention is used in 8K products with a resolution of 7680×4320. A partition on the LCD panel usually comprises a plurality of pixels. The backlight module is formed by stitching 12 backplanes 21, and each backplane 21 comprises 432 backlight units 106. Each backlight unit 106 comprises 4 LED devices 22 connected in series. The driving circuit drives each backlight unit 106 individually, controls light emission separately, and provides the backlight for the pixels in each partition separately. Compared with the backlight module that is driven by whole surface, the brightness control of a partition-driven backlight module in the present invention is more flexible and a luminous effect is better.

Figure 4:
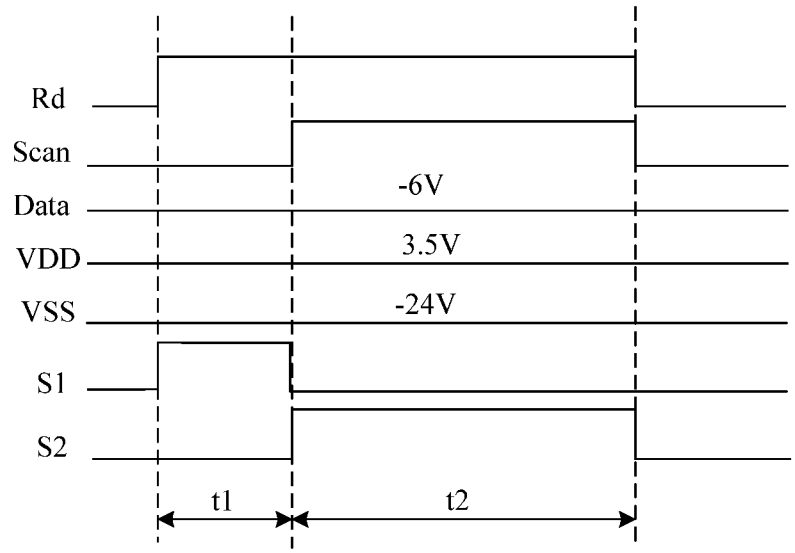
FIG. 4 is a timing diagram of signals of the driving circuit in FIG. 2 during a detection stage.

FIG. 4 is a timing diagram of the driving circuit in FIG. 2 during the detection stage. The detection stage is usually in a time period before the display panel is turned on or the time period after it is turned off. The detection stage comprises an initialization time period t1 and a voltage detection time period t2. A first data signal on the data line Data is −6V, the power high-potential signal is always 3.5V, and the power low-potential signal is always −24V. After the first static contact S1 of the selection switch is connected to the input end of the reference voltage Vref, a high potential of the input end of the reference voltage Vref is −30V.

During the initialization period t1, the first control signal Scan is at a low potential, the first transistor T1 is turned off, the second control signal Rd is at a high potential, the third transistor T3 is turned on, the moving contact K of the selection switch is connected to the first static contact S1, and the reference voltage Vref is input to the second point b. At this time, a gate voltage of the second transistor T2 is Va. A value of Va may be 0, or it may be a voltage value of the initial voltage signal input to the first point a under the control of the first control signal Scan before the data input module 101 under the detection stage. A voltage of the second electrode Vb of the second transistor T2 is equal to Vref, and Va−Vb>Vth, to ensure that after the data voltage is loaded, the second transistor T2 works in a linear region.

During the voltage detection period t2, the first control signal Scan is at a high potential. The first transistor T1 is turned on to input the first data signal data1 with a high potential to the first point a, and a potential Va of the first point a is equal to Vdata1. The second control signal Rd maintains a high potential, the third transistor T3 is turned on, and the moving contact K of the selection switch is connected to the second static contact S2. At this time, the voltage at the second point b continues to rise until Vb=Vdata1−Vth, and the second transistor T2 is turned off. At this time, the potential at the second point b is stable, and the detection end of the threshold voltage Vsensor detects the voltage at the second point b, generates corresponding data, and latches it. The detected voltage value Vsensor is equal to Vdata1−Vth.

At this time, since Vdata1 is a previously known value, the threshold voltage Vth can be obtained by subtracting the detected voltages Vdata1−Vth from the known Vdata1.

Figure 5:
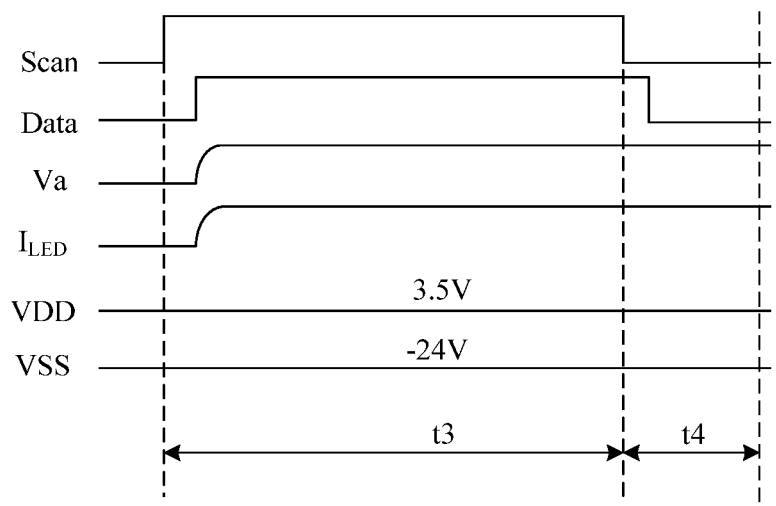
FIG. 5 is a timing diagram of the signals of the driving circuit in FIG. 2 at a display stage.

Shown in FIG. 5 is a timing diagram of the driving circuit in FIG. 2 in the display stage. The display stage comprises multiple frames, and each frame comprises a display frame stage and a blank frame stage, wherein the display frame stage comprises a data writing time period t3 and a lighting time period t4.

During the data writing period t3, the first control signal Scan is at a high potential, the first transistor T1 is turned on, and the data line Data inputs the second data signal data2 with a high potential to the first point a and the storage capacitor Cst. The potential Va of the first point a gradually rises to be equal to Vdata2, and the second transistor T2 is turned on to drive the LED device in the backlight unit 106 to emit light. A current $I_{ED}$ in the LED device also gradually increases, the second control signal Rd is at a low potential, and the third transistor T3 is turned off. In order to improve charging efficiency, the first transistor T1 needs to work in the linear region, and in order to reduce power consumption, the second transistor T2 works in the linear region.

In an embodiment, the detection module 103 is further configured to report a detection result to a timing control chip TCON IC after detecting the threshold voltage of the driving module 102. After the detection stage is completed, the TCON IC calculates the compensation value used to compensate the threshold voltage based on the obtained threshold voltage Vth, and the second data signal data2 is determined according to the compensation value, and the second data signal data2 input in the display stage is controlled by adjusting the voltage values on the scanning line Scan and the data line Data, thereby implementing threshold voltage compensation for the driving transistor.

During the light emitting period t4, the first control signal Scan is at a low potential, the first transistor T1 is turned off, and the second data signal data2 of the data line cannot reach the gate of the second transistor T2. However, due to a storage effect of the storage capacitor Cst, a gate voltage of the second transistor T2 can still continue to be Vdata2, which makes the second transistor T2 work in the linear region, and the driving current enters the LED device in the backlight unit 106 through the second transistor T2, thereby driving the LED device to continue to emit the light.

The driving circuit of the present invention detects the threshold voltage of the second transistor T2 in the detection stage, and then adjusts the voltage value of the second data signal input by the data line Data in the display stage. When the threshold voltage of the second transistor T2 causes a positive drift, the second data signal voltage value is adjusted to be greater than a default value, and when the threshold voltage of the second transistor T2 causes a negative drift, the second data signal voltage value is adjusted to be less than the default value. When the default value is the threshold voltage Vth of the second transistor T2 and does not drift, an input of the data line Data can make the current in the LED device meet the expected voltage value. Through the above steps, the second data signal data2 input to the driving circuits of different backlight units 106 is also different, so that the threshold voltage drift of the driving module in the driving circuit corresponding to the backlight unit 106 can be compensated to reduce the difference in the driving current flowing through the different backlight unit 106, thereby improving a luminous uniformity of the portion of the backlight unit. When the detection module is provided in the driving circuit corresponding to all the backlight units, a luminous uniformity of the entire backlight module can be improved and enhance optical taste of products.

In the above embodiment, the driving circuit detects the threshold voltage of the driving transistor through the time period before turning on or after turning off, and the second data signal is input through the data line to compensate in the display stage, which can compensate for the threshold voltage drift of the driving module 102 in the driving circuit corresponding to the backlight unit. In addition, during the entire display stage, if the backlight unit 106 emits the light for a long time, that is, when the high potential voltage is applied to the gate of the second transistor T2 for a long time, the threshold voltage of the second transistor T2 is prone to cause a positive drift, resulting in insufficient charging of the LED device in the backlight unit 106, and the brightness will decrease after a long time of light emission, which affects a display effect.

Figure 6:
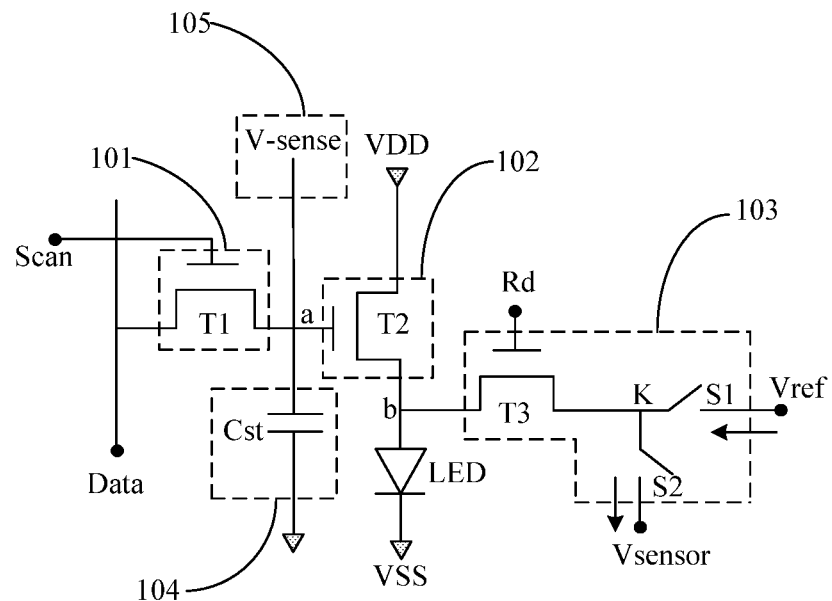
FIG. 6 is a second schematic structural view of the driving circuit corresponding to at least one of the backlight units in the backlight module provided by an embodiment of the present invention.

In order to solve the problem, shown in FIG. 6 is a second schematic structural view of the driving circuit corresponding to at least one of the backlight units in the backlight module provided by the embodiment of the present invention. A difference from the structure in FIG. 2 is that the driving circuit in the embodiment further comprises a compensation module 105. The compensation module 105 is connected to the driving module 102 through the first point a, and is used to pull down the potential of the first point a to a potential lower than the power high-potential signal VDD during the blank frame stage to cause a negative drift in the threshold voltage of the driving module 102.

In an embodiment, the compensation module 105 comprises a compensation line V-sense. One end of the compensation line V-sense is connected to the first point a, and the other end of the compensation line V-sense is connected to the timing control chip.

Figure 7:
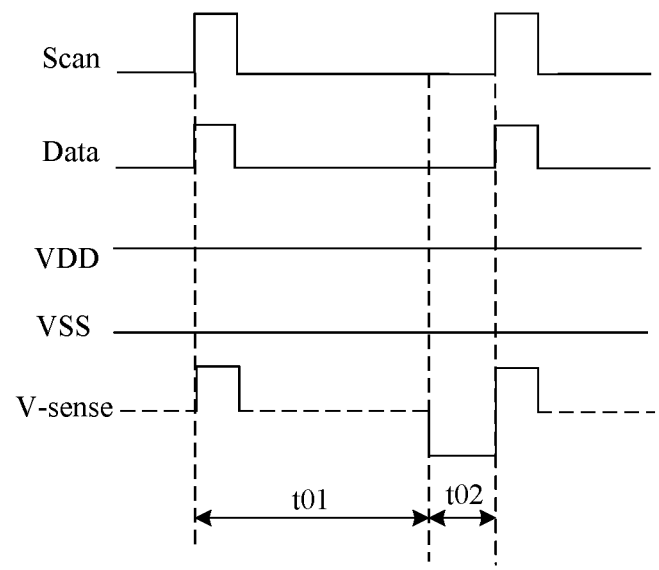
FIG. 7 is a timing diagram of signals of the driving circuit in FIG. 6 during the display stage.

As shown in FIG. 7, which is a timing diagram of the signals of the driving circuit in FIG. 6 in the display stage. The display stage comprises multiple frames, and each frame comprises the display frame stage t01 and the blank frame stage t02. The display frame stage t01 comprises a data writing time period and a light emitting time period, where the data writing time period corresponds to t3 in FIG. 4 and the light emitting time period corresponds to t4 in FIG. 4. The timing of each signal and the working state of each transistor are the same in both figures.

In the display frame stage t01, the gate voltage of the second transistor T2 is maintained at a positive voltage state for a long time. In the state, the threshold voltage of the second transistor T2 will be in a positive drift state. A drift amount of the positive drift of the threshold voltage is $\Delta Vth1$, and $\Delta Vth1$ is a positive value. At this time, the voltage value applied to the gate of the second transistor T2 also needs to increase accordingly, in order to fully turn on the second transistor T2. However, if the voltage Vdata on the data line Data remains unchanged, the second transistor T2 will be undercharged, which eventually reduces the brightness of the backlight unit 106 and affects the display effect.

At the blank frame stage t02, the voltage Vb at the second point b is equal to VDD. At this time, the compensation line V-sense in the compensation module 105 pulls the potential of the first point a to be lower than the potential of the second point b, that is, the potential is less than the power low-potential signal VDD. At this time, Va is less than Vb and Va−Vb<0, then the threshold voltage of the second transistor T2 will cause a negative drift, a change of the threshold voltage negative drift is $\Delta Vth2$, and $\Delta Vth2$ is a negative value.

Within a frame, the threshold voltage of the second transistor T2 causes a positive drift during the display frame stage t01. By disposing the compensation module 105, at the blank frame stage t02, a difference between the potentials of the first point a and the second point b is negative, and the threshold voltage of the second transistor T2 cause a negative drift. A total threshold voltage change of the display frame stage t01 and the blank frame stage t02 is $\Delta Vth1+\Delta Vth2$. Since $\Delta Vth1$ is a positive value and $\Delta Vth2$ is a negative value, the two cancel each other, so that at a beginning of the next frame, the threshold voltage Vth of the second transistor T2 returns to a normal state or close to a normal state, so a situation of positive drift of the threshold voltage of the driving module 102 is alleviated, the backlight unit 106 is charged normally, and the brightness does not decrease during long-term operation.

In order to make the threshold voltage Vth of the second transistor T2 recover to the normal state as much as possible after a negative drift correction, a voltage on the compensation line V-sense can be adjusted to make a decrease of $\Delta Vth2$ as close to or equal to an increase of $\Delta Vth1$ as possible after detecting the value of $\Delta Vth1$, and the two cancel each other as close to 0. Since a time of the display frame stage t01 is usually long and a time of the blank frame stage t02 is relatively short, in order for the threshold voltage drift $\Delta Vth2$ of the second transistor T2 to be expected in a short time, the first compensation voltage can be input to the first point a via the compensation line V-sense in the blank frame stage t02, where the first compensation voltage is negative and is much lower than the value of the power low-potential signal VDD.

In addition, the compensation module 105 is further used to raise the potential of the first point a during the display frame stage t01. As the threshold voltage of the second transistor T2 causes a positive drift after the backlight unit 106 has been operating for a long time, the value of the gate voltage required to open the second transistor T2 also increases, at this time, in the display frame stage t01, the second compensation voltage can be input to the first point a through the compensation line V-sense, the second compensation voltage is positive, by superimposing the second compensation voltage and the voltage Vdata on the data line Data, the second transistor T2 can be opened more fully, and the brightness of the backlight unit 106 can be improved to return to normal state, thus ensuring the display effect. A value of the second compensation voltage can be calculated based on the test result after detecting the value of the current flowing through the backlight unit 106. Wherein an input second compensation voltage is inversely proportional to a detection current, the smaller the detection current, the larger the second compensation voltage value.

The present invention corrects the positive drift of the threshold voltage of the driving module 102 within the display frame stage t01 by adding the compensation module 105 in the blank frame stage t02, so that the difference between the potentials of the first point a and the second point b is negative and the threshold voltage of the driving module 102 causes a negative drift, thereby alleviating the phenomenon of the positive drift of the threshold voltage of the driver module 102 and making the LED device charge normally and not decrease in brightness during a long time operation. During the display frame stage t01, the potential of the first point a is pulled up so that the driving module 102 opens more fully and the brightness of the LED device is increased. The driving circuit of the present invention is simple in structure, small in size and low in cost, which can be used as a technical reserve for a subsequent drive of smaller micro LED devices.

Using the driving circuit shown in FIG. 6, the detection module 103 is disposed to detect the threshold voltage before a power-on detect stage or after a power-off detect stage, and the threshold voltage compensation is then performed during the display phase. The threshold voltage drift of the driving module in the driving circuit corresponding to the backlight unit 106 can be compensated to reduce the difference in the driving current flowing through the different backlight unit 106, thereby improving a luminous uniformity of the portion of the backlight unit. When the detection module is provided in the driving circuit corresponding to all the backlight units, a luminous uniformity of the entire backlight module can be improved and enhance the optical taste of the products. By setting the compensation module 105, in the blank frame stage of the display stage, the difference between the potentials of the first point a and the second point b is negative, the threshold voltage of the driving module 102 cause a negative drift so that the threshold voltage of the driving module in the display frame stage can be corrected by the positive drift, the positive drift of the threshold voltage of the driving module is relieved, so that the backlight unit 106 is charged normally and the brightness does not drop during a long operation. When used together, the two have a greater effect on the improvement of threshold voltage drift and a better display.

The present invention further provides a display device comprising an LCD display panel and a backlight module, wherein the backlight module is the backlight module as described in any one of the preceding claims. In combination with FIG. 1 to FIG. 7, the backlight module comprises a backlight and a driving circuit for driving the backlight. The backlight comprises a plurality of backlight units arranged in an array. Each backlight unit is arranged corresponding to a partition of a liquid crystal display panel, and the driving circuit corresponding to at least one of the backlight units comprises a data signal input module 101, a driving module 102, a detection module 103, and a storage module 104. The data signal input module 101 is configured to input a first data signal data1 to a first point a under a control of a first control signal Scan during a detection stage. The driving module 102 is connected to the data signal input module 101 through the first point a and connected to the backlight unit 106 through a second point b, and is configured to drive the backlight unit 106 to emit light under controls of a potential of the first point a and a power high-potential signal VDD. The detection module 103 is connected to the driving module 102 through the second point b, and is configured for detecting a threshold voltage Vth of the driving module 102 during a detection stage under a control of a second control signal Rd. The storage module 104 is connected to the driving module 102 through the first point a and is configured to store the threshold voltage Vth of the driving module 102. Wherein the data signal input module 101 is further configured to input a compensated second data signal data2 to the first point a according to the threshold voltage Vth detected by the detection module 103 during a display stage.

Specifically, the data signal input module 101 comprises a first transistor T1. A gate of the first transistor T1 is connected to the first control signal Scan, a first electrode of the first transistor T1 is connected to the data line Data, and a second electrode of the first transistor T1 is connected to the first point a.

A first end of the backlight unit 106 is connected to the second point b, and a second end of the backlight unit 106 is connected to a power low-potential signal VSS.

The driving module 102 comprises a second transistor T2. A gate of the second transistor T2 is connected to the first point a, a first electrode of the second transistor T2 is connected to the power high-potential signal VDD, and a second electrode of the second transistor T2 is connected to the second point b.

The detection module 103 comprises a third transistor T3 and a selection switch. A gate of the third transistor T3 is connected to the second control signal Rd, a first electrode of the third transistor T3 is connected to the second point b, and a second electrode of the third transistor T3 is connected to a moving contact K of the selection switch. A first static contact S1 of the selection switch is connected to an input end of a reference voltage Vref, and a second static contact S2 of the selection switch is connected to a detection end of the threshold voltage Vsensor.

The storage module 104 comprises a storage capacitor Cst. A first plate of the storage capacitor Cst is connected to the first point a, and a second plate of the storage capacitor Cst is connected to the power low-potential signal VSS.

In the present invention, each transistor is an N-type or P-type transistor. Among the first electrode and the second electrode of each transistor, one of them is a source and the other is a drain. A voltage value output by the power high-potential signal VDD is greater than a voltage value output by the power low-potential signal VSS. The first control signal Scan is a scan signal provided by a scan line. In the driving module 102, the second transistor T2 is a driving transistor, and the threshold voltage of the driving module 102 is the threshold voltage Vth of the second transistor T2.

In an embodiment, the detection module 103 is configured to control the moving contact K of the selection switch to connect to the first static contact S1 during an initialization period t1 of the detection stage, and control the moving contact K of the selection switch to connect to the second static contact S2 during a voltage detection period t2 of the detection stage.

In an embodiment, the detection module 103 is further configured to report a detection result to a timing control chip after detecting the threshold voltage of the driving module 102.

In an embodiment, the data signal input module 101 is further configured to input an initial voltage signal to the first point a under the control of the first control signal Scan before the detection stage.

In an embodiment, the driving circuit further comprises a compensation module 105, the compensation module 105 is connected to the driving module 101 through the first point a, and is configured to pull down the potential of the first point a to a potential lower than the power high-potential signal during a blank frame stage to cause a negative drift in the threshold voltage of the driving module 102.

The display device provided by the present invention detects the threshold voltage of the driving module by providing the detection module in the driving circuit corresponding to at least one of the backlight units, then in the display stage, the compensated second data signal is input to the first point according to the threshold voltage, which can compensate the threshold voltage drift of the driving module in the driving circuit corresponding to the backlight unit and reduce differences in driving current flowing through different backlight units, thereby improving uniformity of the light emitted by the backlight unit and the backlight module, and improving the optical taste of the products. Wherein, in the display device of the present invention, the liquid crystal display panel is an 8K display panel with a resolution of 7680×4320. The LED device in the backlight module may be a conventional LED device, a mini LED device or a micro LED device. Each backlight unit on the backlight module corresponds to a partition on the LCD panel, and the driving circuit drives each backlight unit individually to control the luminescence separately, compared to the backlight module with full-face drive, the partition-driven backlight module in the present invention has more flexible brightness control and better luminescence effect.

According to the above examples, it can be know that:

An embodiment of the present invention provides the backlight module and the display device. The backlight module comprises the backlight and the driving circuit for driving the backlight, wherein the backlight comprises the plurality of backlight units arranged in an array, each backlight unit is arranged corresponding to the partition of the liquid crystal display panel, and the driving circuit corresponding to at least one of the backlight units comprises the data signal input module, the driving module, the detection module, and the storage module. The data signal input module is configured to input the first data signal to the first point under the control of the first control signal during the detection stage. The driving module is connected to the data signal input module through the first point and connected to the backlight unit through the second point, and is configured to drive the backlight unit to emit the light under the controls of the potential of the first point and the power high-potential signal. The detection module is connected to the driving module through the second point, and is configured for detecting the threshold voltage of the driving module during the detection stage under the control of the second control signal. The storage module is connected to the driving module through the first point and is configured to store the threshold voltage of the driving module. Wherein the data signal input module is further configured to input the compensated second data signal to the first point according to the threshold voltage detected by the detection module during the display stage. The present invention detects the threshold voltage of the driving module by providing the detection module in the driving circuit corresponding to at least one of the backlight units, then in the display stage, the compensated second data signal is input to the first point according to the threshold voltage, which can compensate the threshold voltage drift of the driving module in the driving circuit corresponding to the backlight unit and reduce differences in driving current flowing through different backlight units, thereby improving uniformity of the light emitted by the backlight unit and the backlight module, and improving the optical taste of the products.

In each of the embodiments, a description of each embodiment is focused, and those parts of one embodiment that are not described in detail can be found in the relevant description of other embodiments.

The above is a detailed description of the backlight module and the display device provided in the present invention. In the article, the principles and implementation of the present invention are explained by applying specific examples. The above description of the implementation examples is intended only to assist in understanding the technical scheme of the present invention and its core ideas. The average technician in the field should understand that it is still possible to modify the technical solutions described in the preceding examples, or to replace some of the technical features with equivalent ones. Such modifications or substitutions do not remove the essence of the corresponding technical scheme from the scope of the technical scheme of the embodiments of the present invention.

What is claimed is:

1. A backlight module, comprising:
    a backlight and a driving circuit for driving the backlight, wherein the backlight comprises a plurality of backlight units arranged in an array, each backlight unit is arranged corresponding to a partition of a liquid crystal display panel, and the driving circuit corresponding to at least one of the backlight units comprises:
    a data signal input module configured to input a first data signal to a first point under a control of a first control signal during a detection stage;
    a driving module connected to the data signal input module through the first point and connected to the backlight unit through a second point and configured to drive the backlight unit to emit light under controls of a potential of the first point and a power high-potential signal;
    a detection module connected to the driving module through the second point and configured for detecting a threshold voltage of the driving module during the detection stage under a control of a second control signal; and
    a storage module connected to the driving module through the first point and configured to store the threshold voltage of the driving module;
    wherein the data signal input module is further configured to input a compensated second data signal to the first point according to the threshold voltage detected by the detection module during a display stage.

2. The backlight module as claimed in claim 1, wherein the data signal input module comprises a first transistor, a gate of the first transistor is connected to the first control signal, a first electrode of the first transistor is connected to a data line, and a second electrode of the first transistor is connected to the first point.

3. The backlight module as claimed in claim 2, wherein the driving module comprises a second transistor, a gate of the second transistor is connected to the first point, a first electrode of the second transistor is connected to the power high-potential signal, and a second electrode of the second transistor is connected to the second point.

4. The backlight module as claimed in claim 3, wherein a first end of the backlight unit is connected to the second point, and a second end of the backlight unit is connected to a power low-potential signal.

5. The backlight module as claimed in claim 4, wherein the storage module comprises a storage capacitor, a first plate of the storage capacitor is connected to the first point, and a second plate of the storage capacitor is connected to the power low-potential signal.

6. The backlight module as claimed in claim 5, wherein the detection module comprises a third transistor and a selection switch, a gate of the third transistor is connected to the second control signal, a first electrode of the third transistor is connected to the second point, a second electrode of the third transistor is connected to a moving contact of the selection switch, a first static contact of the selection switch is connected to an input end of a reference voltage, and a second static contact of the selection switch is connected to a detection end of the threshold voltage.

7. The backlight module as claimed in claim 6, wherein the detection module is configured to control the moving contact of the selection switch to connect to the first static contact during an initialization period of the detection stage, and control the moving contact of the selection switch to connect to the second static contact during a voltage detection period of the detection stage.

8. The backlight module as claimed in claim 6, wherein the detection module is further configured to report a detection result to a timing control chip after detecting the threshold voltage of the driving module.

9. The backlight module as claimed in claim 1, wherein the data signal input module is further configured to input an initial voltage signal to the first point under the control of the first control signal before the detection stage.

10. The backlight module as claimed in claim 1, wherein the driving circuit further comprises a compensation module, and the compensation module is connected to the driving module through the first point and configured to pull down the potential of the first point to a potential lower than the power high-potential signal during a blank frame stage to cause a negative drift in the threshold voltage of the driving module.

11. A display device, comprising:
    a liquid crystal display panel and a backlight module, wherein the backlight module comprises a backlight and a driving circuit for driving the backlight, wherein the backlight comprises a plurality of backlight units arranged in an array, each backlight unit is arranged corresponding to a partition of the liquid crystal display panel, and the driving circuit corresponding to at least one of the backlight units comprises:

a data signal input module configured to input a first data signal to a first point under a control of a first control signal during a detection stage;

a driving module connected to the data signal input module through the first point and connected to the backlight unit through a second point and configured to drive the backlight unit to emit light under controls of a potential of the first point and a power high-potential signal;

a detection module connected to the driving module through the second point and configured for detecting a threshold voltage of the driving module during the detection stage under a control of a second control signal; and a storage module connected to the driving module through the first point and configured to store the threshold voltage of the driving module;

wherein the data signal input module is further configured to input a compensated second data signal to the first point according to the threshold voltage detected by the detection module during a display stage.

12. The display device as claimed in claim 11, wherein the data signal input module comprises a first transistor, a gate of the first transistor is connected to the first control signal, a first electrode of the first transistor is connected to a data line, and a second electrode of the first transistor is connected to the first point.

13. The display device as claimed in claim 12, wherein the driving module comprises a second transistor, a gate of the second transistor is connected to the first point, a first electrode of the second transistor is connected to the power high-potential signal, and a second electrode of the second transistor is connected to the second point.

14. The display device as claimed in claim 13, wherein a first end of the backlight unit is connected to the second point, and a second end of the backlight unit is connected to a power low-potential signal.

15. The display device as claimed in claim 14, wherein the storage module comprises a storage capacitor, a first plate of the storage capacitor is connected to the first point, and a second plate of the storage capacitor is connected to the power low-potential signal.

16. The display device as claimed in claim 15, wherein the detection module comprises a third transistor and a selection switch, a gate of the third transistor is connected to the second control signal, a first electrode of the third transistor is connected to the second point, a second electrode of the third transistor is connected to a moving contact of the selection switch, a first static contact of the selection switch is connected to an input end of a reference voltage, and a second static contact of the selection switch is connected to a detection end of the threshold voltage.

17. The display device as claimed in claim 16, wherein the detection module is configured to control the moving contact of the selection switch to connect to the first static contact during an initialization period of the detection stage, and control the moving contact of the selection switch to connect to the second static contact during a voltage detection period of the detection stage.

18. The display device as claimed in claim 16, wherein the detection module is further configured to report a detection result to a timing control chip after detecting the threshold voltage of the driving module.

19. The display device as claimed in claim 11, wherein the data signal input module is further configured to input an initial voltage signal to the first point under the control of the first control signal before the detection stage.

20. The display device as claimed in claim 11, wherein the driving circuit further comprises a compensation module, and the compensation module is connected to the driving module through the first point and configured to pull down the potential of the first point to a potential lower than the power high-potential signal during a blank frame stage to cause a negative drift in the threshold voltage of the driving module.

* * * * *